(12) United States Patent
Montenguise et al.

(10) Patent No.: US 10,405,498 B2
(45) Date of Patent: Sep. 10, 2019

(54) FLAIL CHOPPER ASSEMBLY FOR AN AGRICULTURAL COMBINE

(71) Applicant: CNH Industrial America, LLC, New Holland, PA (US)

(72) Inventors: Justin L. Montenguise, Bettendorf, IA (US); Stefaan Desmet, Vosselare (BE); Craig E. Murray, Davenport, IA (US); Nicholas S. Shane, Bennett, IA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 139 days.

(21) Appl. No.: 15/359,904

(22) Filed: Nov. 23, 2016

(65) Prior Publication Data
US 2018/0139905 A1   May 24, 2018

(51) Int. Cl.
| | |
|---|---|
| *A01F 12/40* | (2006.01) |
| *A01F 29/09* | (2010.01) |
| *A01D 41/12* | (2006.01) |
| *A01F 29/06* | (2006.01) |

(52) U.S. Cl.
CPC ........ *A01F 29/095* (2013.01); *A01D 41/1243* (2013.01); *A01F 12/40* (2013.01); *A01F 29/06* (2013.01)

(58) Field of Classification Search
USPC ....................................................... 460/112
See application file for complete search history.

(56) References Cited

U.S. PATENT DOCUMENTS

| | | | |
|---|---|---|---|
| 1,759,905 A | * | 5/1930 | Keith ....................... A01F 29/00 241/185.5 |
| 2,815,781 A | | 12/1957 | Myrold |
| 3,039,505 A | | 6/1962 | Mast |

(Continued)

FOREIGN PATENT DOCUMENTS

| | | |
|---|---|---|
| CN | 102696364 | 10/2012 |
| DE | 4131895 A1 | 7/1993 |

(Continued)

OTHER PUBLICATIONS

European Search Report for European Application No. 17203373.0, dated Apr. 19, 2018 (5 pages).

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

A chopper assembly for a crop residue distribution system of an agricultural combine may include a rotor shaft extending lengthwise along a rotational axis between a first end and a second end. The chopper assembly may also include a plurality of flail blades pivotally coupled to the rotor shaft. Each flail blade may be configured to pivot relative to the rotor shaft about a pivot axis, with the flail blades being spaced apart axially from one another between the first and second ends of the rotor shaft. In addition, the chopper assembly may include one or more features configured to improve the performance of the chopper assembly during low speed operation. For example, the feature(s) may correspond to one or more fixed blades coupled to the rotor shaft and/or one or more torsional springs provided in operative association with one or more of the flail blades.

20 Claims, 9 Drawing Sheets

(56) References Cited

U.S. PATENT DOCUMENTS

| | | | |
|---|---|---|---|
| 3,338,037 A | | 8/1967 | Bauer et al. |
| 3,465,507 A | * | 9/1969 | Fishaw ................ A01D 34/535 |
| | | | 56/294 |
| 3,545,187 A | | 12/1970 | Whitney |
| 3,693,335 A | | 9/1972 | Mathews |
| 3,717,062 A | * | 2/1973 | Gaeddert ................ A01F 12/40 |
| | | | 241/292.1 |
| 3,779,251 A | | 12/1973 | Rowland-Hill et al. |
| 5,272,861 A | * | 12/1993 | Roynberg ............ A01B 33/144 |
| | | | 172/91 |
| 5,362,004 A | | 11/1994 | Bateman |
| 5,413,286 A | | 5/1995 | Bateman |
| 5,501,635 A | * | 3/1996 | Niermann ................ A01F 12/40 |
| | | | 460/112 |
| 6,592,061 B2 | | 7/2003 | Watajima et al. |
| 6,783,453 B2 | | 8/2004 | Bueermann et al. |
| 6,945,025 B2 | | 9/2005 | Morency et al. |
| 7,121,485 B2 | | 10/2006 | Smith |
| 7,337,601 B1 | | 3/2008 | Coffin |
| 8,221,203 B1 | * | 7/2012 | Flickinger ............ A01F 29/095 |
| | | | 460/112 |
| 8,298,058 B2 | * | 10/2012 | Lauer ...................... A01F 12/40 |
| | | | 460/112 |
| 9,137,949 B2 | | 9/2015 | Isaac et al. |
| 2004/0014511 A1 | | 1/2004 | Johnson et al. |

FOREIGN PATENT DOCUMENTS

| | | |
|---|---|---|
| DE | 102007053923 A1 | 5/2009 |
| EP | 1721514 | 11/2006 |
| EP | 1723843 A1 | 11/2006 |
| EP | 1844645 A1 | 10/2007 |
| FR | 2241232 | 3/1975 |

\* cited by examiner

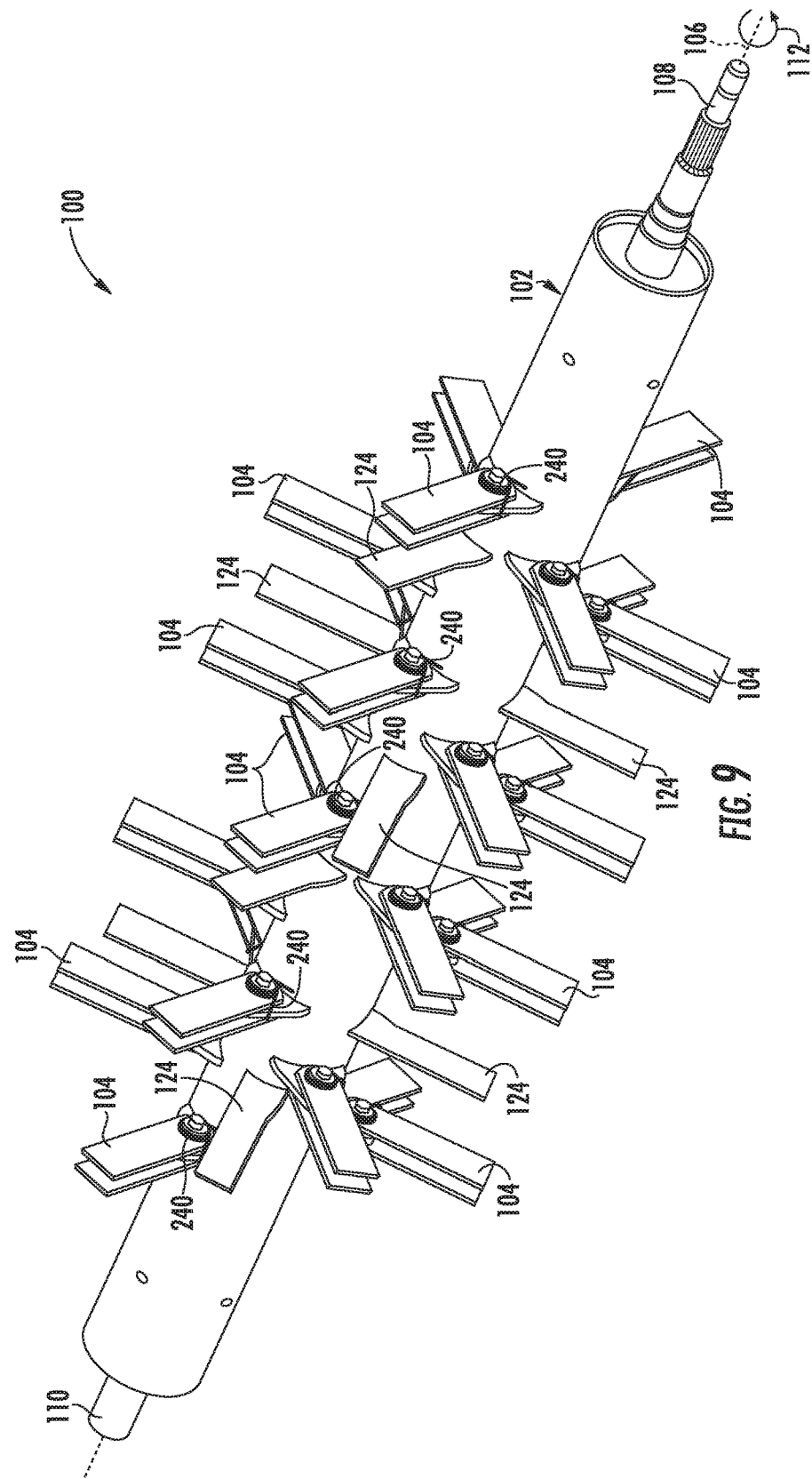

FLAIL CHOPPER ASSEMBLY FOR AN AGRICULTURAL COMBINE

FIELD OF THE INVENTION

The present subject matter relates generally to agricultural combines and, more particularly, to an improved flail chopper assembly for use within a crop residue distribution system of an agricultural combine.

BACKGROUND OF THE INVENTION

Axially arranged rotary threshing or separating systems have long been in use in agricultural combines for threshing crops to separate grain from crop residue, also referred to as material other than grain (MOG). Such axially arranged systems typically include at least one cylindrical rotor rotated within a cage or concave, with the rotor and surrounding concave being oriented so as to extend forwardly to rearwardly within the combine. During operation of the combine, crop material is fed or directed into a circumferential passage between the rotor and the concave and is carried rearwardly along a generally helical path through such passage by rotation of the rotor as grain is threshed from the crop material. The flow of crop residue remaining between the rotor and concave after threshing is typically discharged or expelled at a rear or downstream end of the rotor. After discharge from the threshing system, the crop residue is typically directed into a crop residue distribution system located below and rearwardly of the rear end of the rotor. The crop residue distribution system typically includes a chopper assembly that conveys and/or chops and propels the residue rearwardly towards an area within the rear end of the combine, hereinafter referred to as a distribution chamber. The crop residue provided within the distribution chamber may either be discharged therefrom onto a field as a windrow or be directed into a chopper and/or spreader mounted on or at the rear end of the combine that is operable to spread the residue over a swath of a field.

Typically, the chopper assembly of a crop residue distribution system is configured to perform two primary functions: (1) chop the crop residue so that is can decompose quickly; and (2) convey the crop residue to the rear end of the combine. When it is desired to chop the crop residue and spread the resulting material back into the field, the chopper assembly is typically rotated at a high speed, which allows the chopper assembly to efficiently perform both of its functions. However, it is often desired to not chop the crop residue and, instead, collect it for baling. In such instances, the chopper assembly must be operated at a relatively low sped to prevent the crop residue from being chopped. Such low speed operation can negatively impact the ability of the chopper assembly to convey the crop residue towards the rear end of the combine, particularly when the chopper assembly corresponds to a flail chopper assembly having a plurality of flail blades pivotally coupled to a corresponding rotor shaft. With such chopper assemblies, the rotation of the rotor shaft at the low speed required to prevent chopping of the crop residue typically does not create enough force to maintain the flail blades at their extended, radially oriented position. As such, the flail blades tend to pivot backward during low speed operation, which significantly impacts the operating efficiency of the chopper assembly.

Accordingly, an improved flail chopper assembly for use within a crop residue distribution system of an agricultural combine that addresses one or more of the issues described above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a chopper assembly for a crop residue distribution system of an agricultural combine. The chopper assembly may include a rotor shaft extending lengthwise along a rotational axis between a first end and a second end. The chopper assembly may also include a plurality of flail blades pivotally coupled to the rotor shaft. Each flail blade may be configured to pivot relative to the rotor shaft about a pivot axis. The flail blades may be spaced apart axially from one another between the first and second ends of the rotor shaft. In addition, the chopper assembly may include a plurality of fixed blades non-pivotally coupled to the rotor shaft. The fixed blades may be spaced apart axially from one another between the first and second ends of the rotor shaft, with each fixed blade being axially aligned with a respective flail blade of the flail blades.

In another aspect, the present subject matter is directed to a chopper assembly for a crop residue distribution system of an agricultural combine. The chopper assembly may include a rotor shaft extending lengthwise along a rotational axis, with the rotor shaft being configured rotate about the rotational axis in a rotational direction. The chopper assembly may also include a plurality of flail blades coupled to the rotor shaft. Each flail blade may include at least one blade member pivotally coupled to the rotor shaft at a pivot axis such that the blade member(s) is configured to pivot relative to the rotor shaft about the pivot axis. In addition, the chopper assembly may include a torsional spring coupled to the blade member(s). The torsional spring may be configured to apply a biasing force against the blade member(s) that urges the blade member(s) to pivot relative to the rotor shaft in the rotational direction of the rotor shaft.

In a further aspect, the present subject matter is directed to an agricultural combine. The combine may include a threshing system configured to separate crop residue from another crop material received by the threshing system. The combine may also include a crop residue distribution system configured to receive the crop residue discharged from the threshing system. The crop residue distribution system may include a chopper assembly having a rotor shaft extending lengthwise along a rotational axis between a first end and a second end, with the rotor shaft being configured rotate about the rotational axis in a rotational direction. The chopper assembly may also include a plurality of flail blades pivotally coupled to the rotor shaft. Each flail blade may include at least one blade member configured to pivot relative to the rotor shaft about a pivot axis, with the flail blades being spaced apart axially from one another between the first and second ends of the rotor shaft. In addition, the chopper assembly may include a fixed blade non-pivotally coupled to the rotor shaft, with the fixed blade being axially aligned with a corresponding flail blade of the flail blades. Moreover, the chopper assembly may include a torsional spring coupled to the blade member(s) of a given flail blade of the flail blades. The torsional spring may be configured to apply a biasing force against the blade member(s) that urges the blade member(s) to pivot relative to the rotor shaft in the rotational direction of the rotor shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 illustrates a perspective view of a further embodiment of the chopper assembly shown in FIG. 2, particularly illustrating the chopper assembly including a combination of fixed blades and torsional springs.

DETAILED DESCRIPTION OF THE INVENTION

Figure 1:
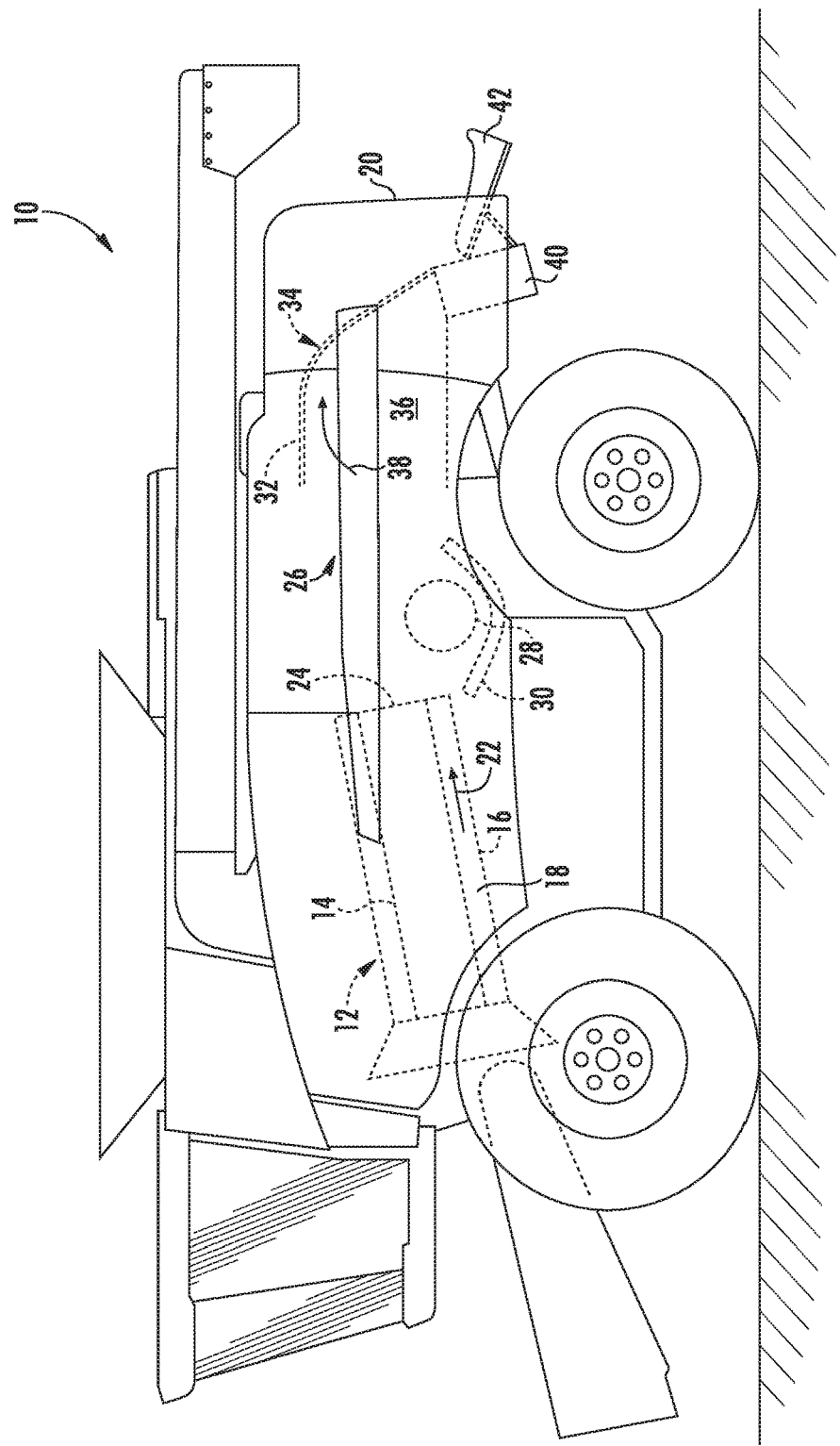
FIG. 1 illustrates a side view of one embodiment of an agricultural combine in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved chopper assembly for use within a crop residue distribution system of an agricultural combine. Specifically, in accordance with aspects of the present subject matter, the disclosed chopper assembly corresponds to a flail-type chopper assembly including a plurality of flail blades pivotally coupled to a rotor shaft. Additionally, in several embodiments, the chopper assembly may include one or more features that are configured to enhance the material conveying capabilities of the chopper assembly during low speed operation. As such, the disclosed chopper assembly may allow for the effective and efficient conveyance of crop residue at both high and low operational speeds.

For instance, as will be described below, the chopper assembly may, in several embodiments, include one or more fixed blades rigidly or non-pivotally coupled to the rotor shaft. The fixed blades may generally be configured to function as an additional material conveying means during low speed operation. For example, in one embodiment, each fixed blade may be axially aligned on the rotor shaft with a respective flail blade, with the fixed blade being coupled to the rotor shaft at a location circumferentially behind the respective flail blade relative to the rotational direction of the rotor shaft. In such an embodiment, in the event that the flail blade pivots backwards during low speed operation, the trailing fixed blade may serve to efficiently and effectively convey the adjacent crop residue.

Moreover, in addition to the fixed blade(s) (or as an alternative thereto), the chopper assembly may include one or more biasing members provided in operative association with a corresponding number of flail blades of the chopper assembly. For instance, as will be described below, torsional springs may be installed relative to any number of the flail blades to allow the torsional springs to apply a biasing force against the fail blades that urges the blades forward in the rotational direction of the rotor shaft (e.g., by biasing the flail blades to their neutral or radially oriented position). As such, the torsional springs may function to provide an additional force against the flail blades so as to prevent or limit backwards pivoting of the flail blades during low speed operation.

Referring now to the drawings, FIG. 1 illustrates a simplified, side view of one embodiment of an agricultural combine 10. In general, the combine 10 may be configured the same as or similar to any suitable agricultural combine known in the art. For instance, as shown in FIG. 1, the combine 10 may include an axially arranged threshing system 12. As is generally understood, the threshing system 12 may include a cylindrical rotor 14 rotatably supported within a cage or concave 16 for conveying a flow of crop material in a helical flow path along a circumferential space 18 defined between the rotor 14 and the concave 16. As the crop material is moved through the space 18 towards a rear end 20 of the combine 10 (indicated by arrow 22), the crop (e.g., grain, legumes, and/or the like) may be separated from the residue (e.g., husks, pods and/or the like) and subsequently removed from the threshing system 12. The crop residue may continue along the helical path and may be subsequently discharged through a discharge opening (not shown) defined at a downstream end 24 of the threshing system 12.

In addition, the combine 10 may include a crop residue distribution system 26 for expelling the crop residue from the combine 10. As shown, the distribution system 26 may include a chopper assembly 28 rotatably supported above a concave pan 30. As is generally understood, the chopper assembly 28 may be configured to be rotated to convey the flow of crop residue exiting the threshing system 12 towards the rear end 20 of the combine 10. As indicated above, in many instances, the chopper assembly 28 may be configured to be operated at a high rotational speed such that the crop residue is chopped and subsequently propelled towards the rear end 20 of the combine 10. Alternatively, the chopper assembly 28 may be operated at a relatively low rotational speed such that the crop residue is simply conveyed towards the rear end 20 of the combine 10 without being chopped.

In several embodiments, the crop residue may be conveyed or propelled along a series of internal shields or panels, such as a guide panel 32 (e.g., a strawhood) and a windrow door assembly 34, towards the rear end 20 of the combine 10. For instance, as shown in FIG. 1, the concave pan 30 may be angled in a manner such that the crop residue may be propelled rearwardly and upwardly from the chopper assembly 28 into a distribution chamber 36, wherein the residue is directed along the guide panel 32 towards the windrow door assembly 34 (indicated by arrow 38). Depending on whether the windrow door assembly 34 is in a closed or opened position, the crop residue may be directed through the distribution chamber 36 and into a crop residue chopper and/or spreader 40 for swath spreading (e.g., when the door is closed) or through a rear opening of the combine 10 for windrowing (e.g., when the door is opened).

Additionally, as shown in FIG. 1, the distribution system 26 may also include a windrow chute 42 at the rear end 20 of the combine 10 for distributing the crop residue expelled through the rear opening of the combine 10. For instance, a portion of the windrow door assembly 34 may be configured to deflect the flow of crop residue onto the windrow chute 42. The crop residue may then be decelerated as it travels along the windrow chute 42 before being dispensed onto a field as a windrow.

It should be appreciated that the configuration of the agricultural combine 10 described above and shown in FIG. 1 is provided only to place the present subject matter in an exemplary field of use. Thus, it should be apparent that the present subject matter may be readily adaptable to any manner of combine configuration.

Figure 2:
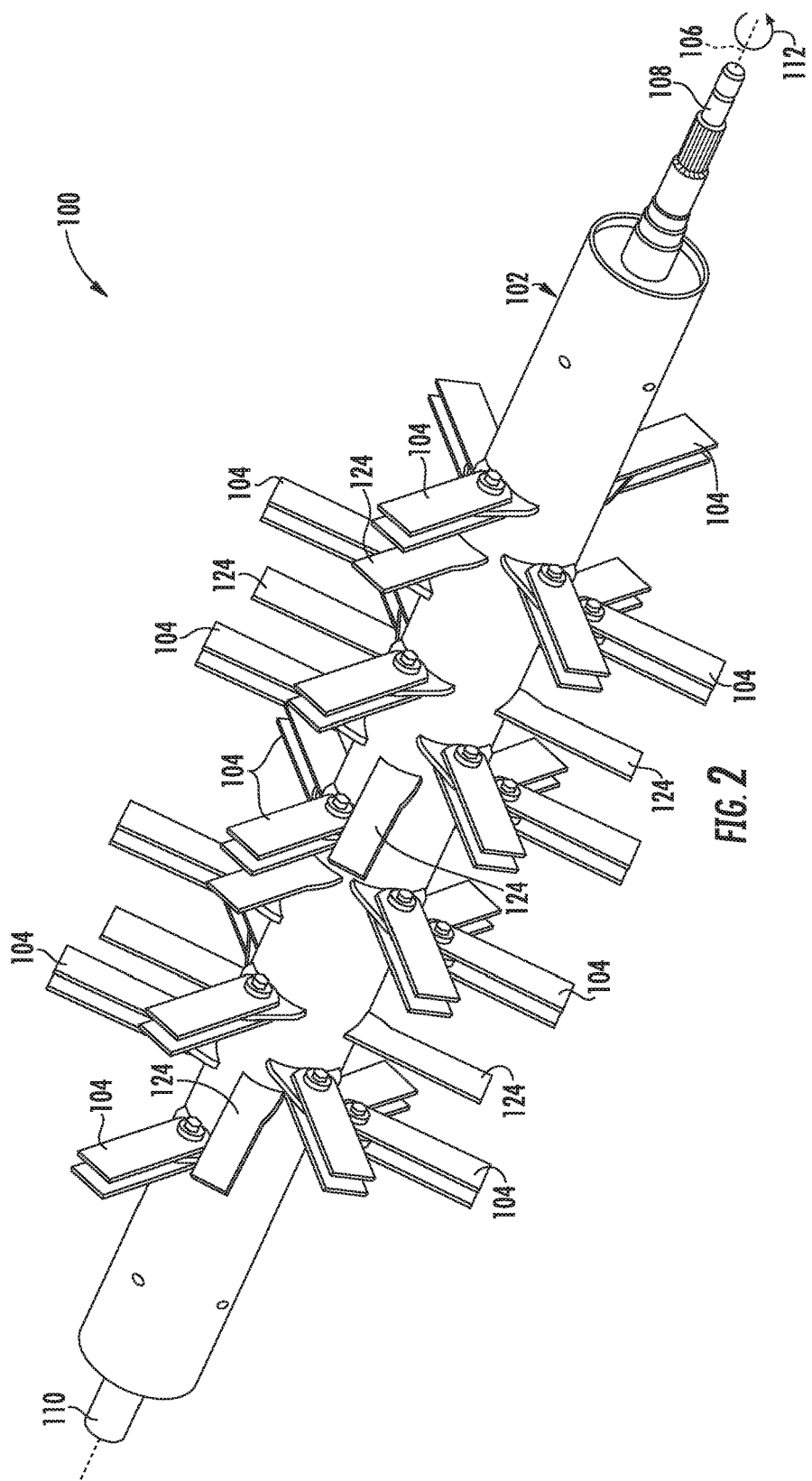
FIG. 2 illustrates a perspective view of one embodiment of a chopper assembly suitable for use within a crop residue distribution system of an agricultural combine in accordance with aspects of the present subject matter, particularly illustrating the chopper assembly including a plurality of fixed blades coupled to the rotor shaft of the chopper assembly.
Figure 3:
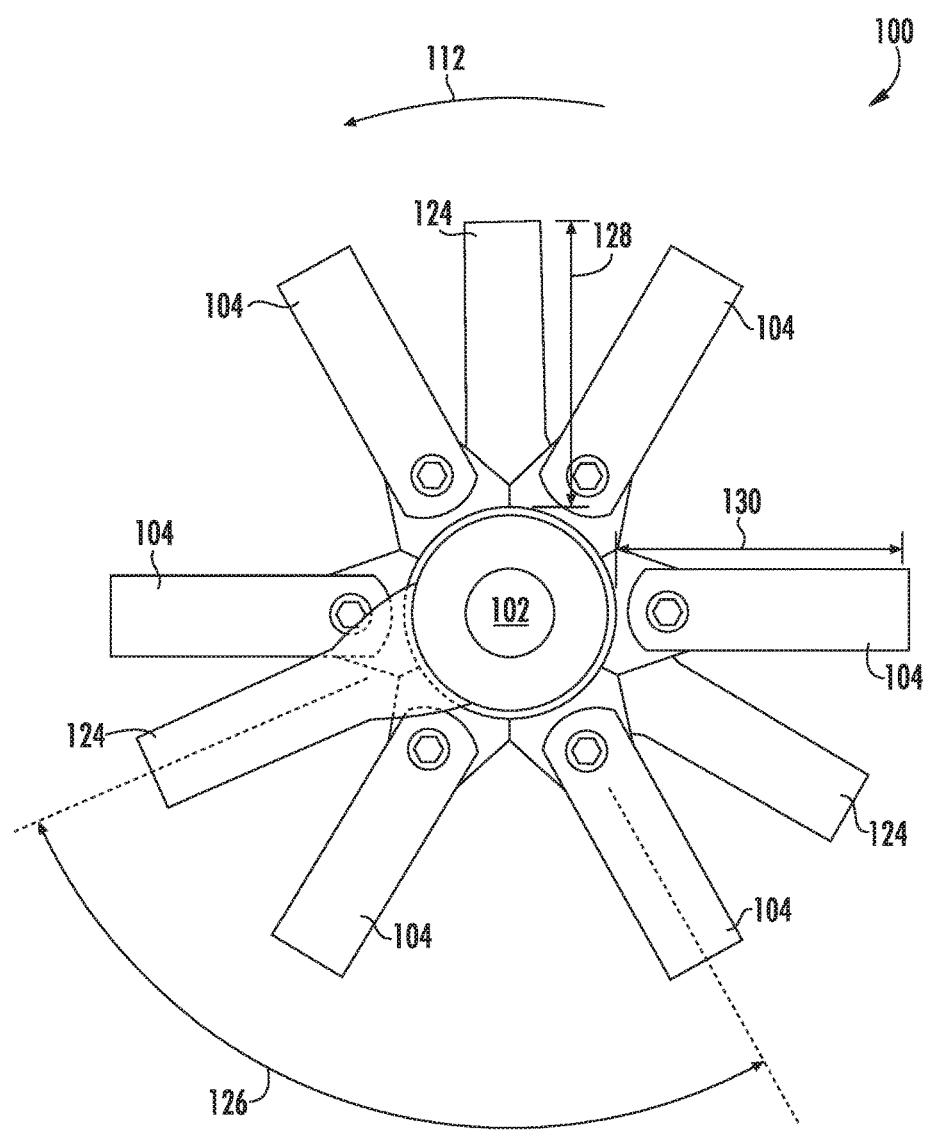
FIG. 3 illustrates an axial view of the chopper assembly shown in FIG. 2, particularly illustrating the typical orientation of the flail blades of the chopper assembly during high speed operation.
Figure 4:
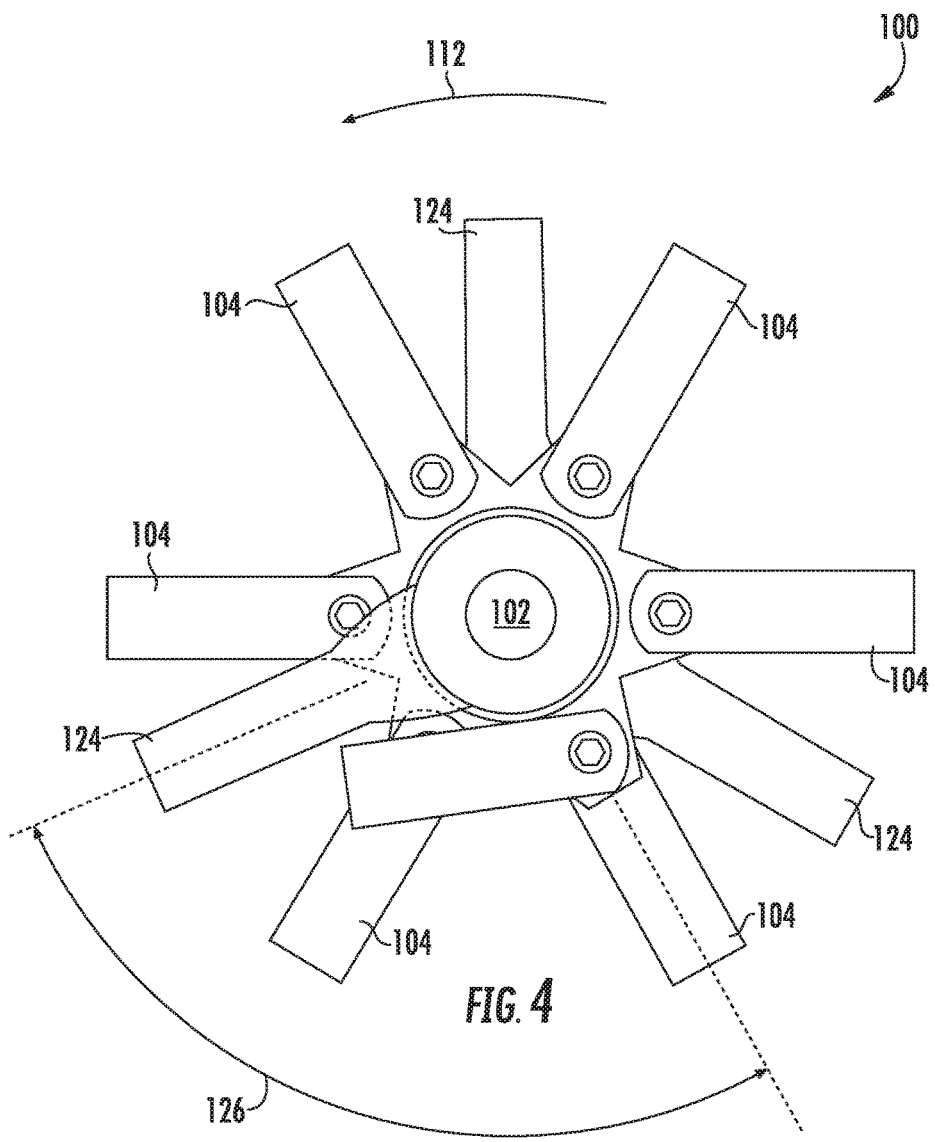
FIG. 4 illustrates another axial view of the chopper assembly shown in FIG. 2, particularly illustrating one of the flail blades pivoted backwards, which may be indicative of the orientation of one or more of the flail blades during low speed operation.
Figure 5:
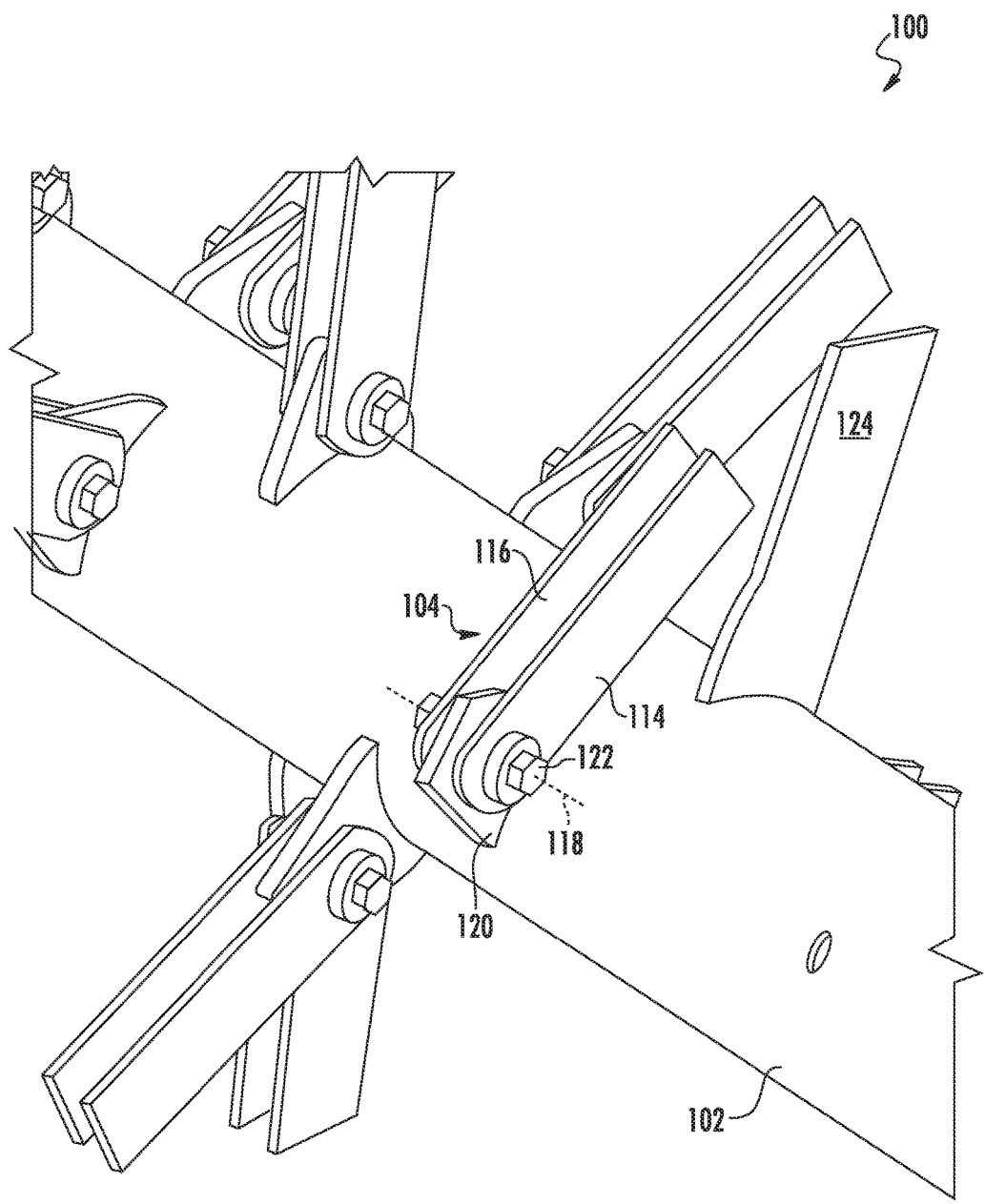
FIG. 5 illustrates a close-up, perspective view of a portion of the chopper assembly shown in FIG. 2.

Referring now to FIGS. 2-5, one embodiment of a chopper assembly 100 suitable for use within a crop residue distribution system of an agricultural combine is illustrated in accordance with aspects of the present subject matter. Specifically, FIG. 2 illustrates a perspective view of the chopper assembly 100. FIGS. 3 and 4 illustrate axial views of the chopper assembly 100 shown in FIG. 2, particularly illustrating the typical orientation of flail blades 104 of the chopper assembly 100 during high speed operation of the chopper assembly 100 and FIG. 4 illustrating one of the flail blades 104 pivoted backwards, which may often occur during low speed operation of the chopper assembly 100. Additionally, FIG. 5 illustrates a close-up, perspective view of a portion of the chopper assembly 100 shown in FIG. 2.

As shown, the chopper assembly 100 may include a rotor shaft 102 and a plurality of flail blades 104 pivotally coupled to the rotor shaft 102. In general, the rotor shaft 102 may be configured to extend lengthwise along a longitudinal or rotational axis 106 between a first end 108 and a second end 110. As is generally understood, the axial ends 108, 110 of the rotor shaft 102 may be rotationally supported within the combine 10 such that the rotor shaft 102 may be rotated about its rotational axis 106 in a given rotational direction (e.g., as indicated by arrow 112 in FIGS. 2-5). Additionally, one or more of the ends 108, 110 of the rotor shaft 102 may be configured to be coupled to a suitable drive device (e.g., a motor) configured to rotationally drive the rotor shaft 102.

Each flail blade 104 of the chopper assembly 100 may generally include one or more blade members configured to be pivotally coupled to the rotor shaft 102 about a shared or common pivot axis. For instance, as particularly shown in FIG. 5, each flail blade 104 may include both a first blade member 114 and a second blade member 116 such that the flail blade 104 comprises a pair of blade members 114, 116 pivotally coupled to the rotor shaft 102 about a common pivot axis 118. However, in other embodiments, each flail blade 104 may include a single blade member pivotally coupled to the rotor shaft 102 or three or more blade members pivotally coupled to the rotor shaft 102 about a common pivot axis.

In general, the blade members 114, 116 may be configured to be coupled to the rotor shaft 102 using any suitable means. For instance, as particularly shown in FIG. 5, the chopper assembly 100 may include plurality of radially extending mounting flanges 120 coupled to the rotor shaft 102 (e.g., via welding or using suitable fasteners), with each mounting flange 120, in turn, being configured to couple one of the flail blades 104 to the rotor shaft 102. In such an embodiment, a pivot bolt 122 may be inserted through aligned pivot holes (not shown) defined in the mounting flange 120 and the blade members 114, 116 to allow the blade members 114, 116 to be pivotally coupled to the rotor shaft 102 via each mounting flange 120. As shown in FIG. 5, in embodiments in which each flail blade 104 includes a pair of blade members 114, 116, the blade members 114, 116 may, for example, be pivotally coupled along opposed sides of the adjacent mounting flange 120. It should be appreciated that a suitable retaining nut or any other suitable retaining feature may be coupled to one end of the pivot bolt 122 to maintain the pivot bolt 122 within the aligned openings defined through the blade members 114, 116 and the mounting flange 120.

In several embodiments, the flail blades 104 may be configured to be pivotally coupled to the rotor shaft 102 at various axially spaced apart locations between the opposed axial ends 108, 110 of the rotor shaft 102. For instance, as shown in FIG. 2, the chopper assembly 100 may, in one embodiment, include two pairs of flail blades 104 pivotally coupled to rotor shaft 102 at each axial location, with the flail blades 104 of each pair being circumferentially offset from one another by 180 degrees. In such an embodiment, the next adjacent pair of flail blades 104 may be circumferentially offset from the neighboring pair of flail blades 104 by a given offset angle (e.g., 60 degrees) so that the chopper assembly 100 includes a plurality of pairs of flail blades 104 coupled to the rotor shaft 102 that are both circumferentially and axially offset from any adjacent or neighboring pairs of flail blades 104. However, in other embodiments, the chopper assembly 100 may include a single flail blade 104 pivotally coupled to the rotor shaft 102 at each axial location or three or more flail blades 104 pivotally coupled to the rotor shaft 102 at each axial location. Additionally, it should be appreciated that the various flail blades 104 may generally have any suitable axial spacing relative to one another and/or may have any suitable circumferential positing relative to one another, including being circumferential aligned and/or being circumferentially offset by any suitable offset angle.

Referring particularly to FIGS. 3 and 4, during operation of the chopper assembly 100, the orientation of the flail blades 104 relative to the rotor shaft 102 may vary depending on the rotational speed of the rotor shaft 102 and/or whether any foreign objects are being conveyed through the chopper assembly 100. For instance, as shown in FIG. 3, during high speed operation, the centrifugal force caused by the rotation of the rotor shaft 102 typically results in the flail blades 104 being forced outwardly into a radially oriented position (e.g., such that the blade members 114, 116 are oriented substantially perpendicular to a tangent line defined on the outer surface of the rotor shaft 102 at the location of the pivotal connection between each flail blade 104 and the rotor shaft 102). This radial orientation allows the flail blades 104 to effectively and efficiently convey the crop reside as the rotor shaft 102 is being rotated. Additionally, during such high speed operation, a given flail blade 104 will typically only pivot backwards relative to the rotational direction 112 of the rotor shaft 102 when a foreign object (e.g., a rock) contacts the blade 104. However, during low speed operation, the centrifugal force caused by the rotation of the rotor shaft 102 is typically insufficient to force the flail blades 104 outward into their radially oriented position. As such, as crop residue is being conveyed though the chopper assembly 100, the flail blades 104 tend to pivot backwards relative to the rotational direction 112 of the rotor shaft 104, thereby reducing the effectiveness of the flail blades 104 in conveying the crop residue through the chopper assembly 100. For instance, FIG. 4 illustrates one of the flail blades 104 pivoted backwards to a maximum pivot position relative to the radially oriented position. At such position, the flail blade 104 typically exhibits extremely low material conveying efficiency.

As indicated above, to address such backward pivoting or retracting of the flail blades 104, the disclosed chopper assembly 100 may include a plurality of fixed blades 124 rigidly or non-pivotally coupled to the rotor shaft 102 at various locations to provide an additional conveying means for the chopper assembly 100 during low speed operation. In general, each fixed blade 124 may be positioned at any suitable location on the rotor shaft 102. However, in several embodiments, the fixed blades 124 may be spaced apart axially along the length of the rotor shaft 102, with each fixed blade 124 being positioned at one of the axial locations of the flail blades 104 so that each fixed blade 124 is axially aligned with the flail blade(s) 104 installed at such location. For instance, in the view shown in FIG. 5, the chopper assembly 100 is shown as including a fixed blade 124 coupled to the rotor shaft 102 at the same axial location as one of the flail blades 104 such that the fixed blade 124 and the flail blade 104 are axially aligned with one another. In one embodiment, a fixed blade 124 may be coupled to the rotor shaft 102 at each axial location of the various flail blades 104 of the chopper assembly 100. Alternatively, as shown in the illustrated embodiment, the fixed blades 124 may be provided at selected axial locations along the rotor shaft 102 such that chopper assembly 100 includes one or more flail blades 104 that are axially aligned with a corresponding fixed blade 124 and one or more flail blades 104 that are not axially aligned with a corresponding fixed blade 124.

It should be appreciated that the fixed blades 124 may be rigidly or non-pivotally coupled to the rotor shaft 102 using any suitable means. For instance, in one embodiment, the fixed blades 124 may be welded to the rotor shaft 102. In other embodiments, the fixed blades 124 may be rigidly coupled to the rotor shaft 102 using mechanical fasteners and/or any other suitable non-pivoting attachment means.

It should also be appreciated that the fixed blades 124 may correspond to rigid chopper blades. For instance, the fixed blades 124 may be formed from a rigid material, such as steel and/or the like, such that the blades 124 does not bend or flex during operation of the chopper assembly 100.

In several embodiments, at each axial location including a flail blade 104 and a corresponding fixed blade 124, the fixed blade 124 may be circumferentially offset from the axially aligned flail blade 104 in a direction opposite the rotational direction 112 of the rotor shaft 102. Specifically, as shown in FIGS. 3 and 4, each fixed blade 124 may be circumferentially offset from its corresponding flail blade 104 by an offset angle 126 extending in the direction opposite the rotational direction 112 of the rotor shaft 102. In one embodiment, the offset angle 126 may be selected such that, when the flail blade 104 is retracted or pivoted to its maximum pivot position (e.g., as shown in FIG. 4), the flail blade 104 does not contact its corresponding, axially aligned fixed blade 124. In such an embodiment, the particular offset angle 126 defined between the flail blade 104 and the fixed blade 124 may generally vary depending on the length of the flail blade 104, the diameter of the rotor shaft 102, the pivot range of the flail blade 104 and/or any other suitable factors. However, in one embodiment, the offset angle 126 may generally range from 60 degrees to 120 degrees, such as from 70 degrees to 110 degrees, or from 80 degrees to 100 degrees and/or any other suitable subranges therebetween.

By providing an axially aligned fixed blade 124 located circumferentially behind one or more of the flail blades 104, the fixed blade(s) 124 may improve the material conveying capabilities of the chopper assembly 100 during low speed operation. Specifically, when the flail blade 104 positioned in front of a given fixed blade 124 pivots backwards from its radially oriented position, the fixed blade 124 may function as the material conveying means at the corresponding axial location on the rotor shaft 102 to ensure that the chopper assembly 100 continues to effectively and efficiently convey crop residue through the chopper assembly 100 towards the rear end 20 of the combine 10. Moreover, the disclosed placement of the fixed blades 124 may allow the flail blades 104 to at least partially protect the trailing fixed blades 124 during an operational event including a foreign object. For instance, when a foreign object is transferred through the chopper assembly 100, the leading flail blade 104 may absorb all or a portion of the energy from the impact with the foreign object as the flail blade 104 retracts or pivots backwards, thereby reducing the likelihood of damage occurring to the trailing fixed blade 124.

It should be appreciated that, in one embodiment, the fixed blades 124 may be dimensioned or sized similarly to the flail blades 104. For instance, as shown in FIG. 3, each fixed blade 124 may define a radial height 128 relative to the outer surface of the rotor shaft 102 that is substantially equal to a radial height 130 of the flail blades 104. However, in other embodiments, the radial heights 128 of the fixed blades 124 may be greater than or less than the radial heights 130 of the flail blades 104.

It should also be appreciated that, although the fixed blades 124 have generally be described above as being axially aligned with a corresponding flail blade 104, the fixed blades 124 may, instead, by axially offset from the flail blades 104. For instance, in one embodiment, the flail blades 104 and the fixed blades 124 alternating axial locations along the length of the rotor shaft 102.

Figure 6:
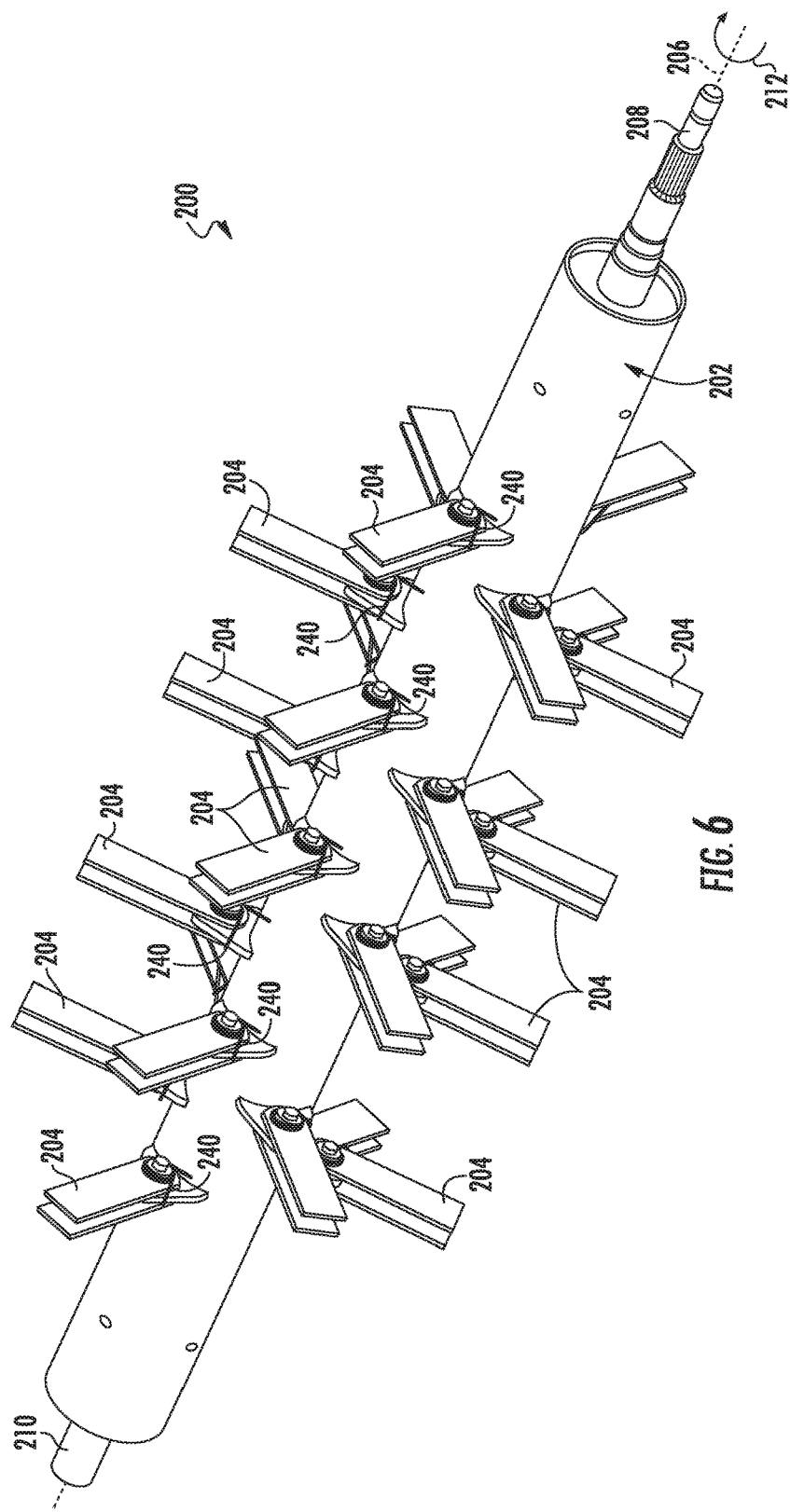
FIG. 6 illustrates a perspective view of another embodiment of a chopper assembly suitable for use within a crop residue distribution system of an agricultural combine in accordance with aspects of the present subject matter, particularly illustrating the chopper assembly include a plurality of torsional springs provided in operative association with a portion of the flail blades of the chopper assembly.
Figure 7:
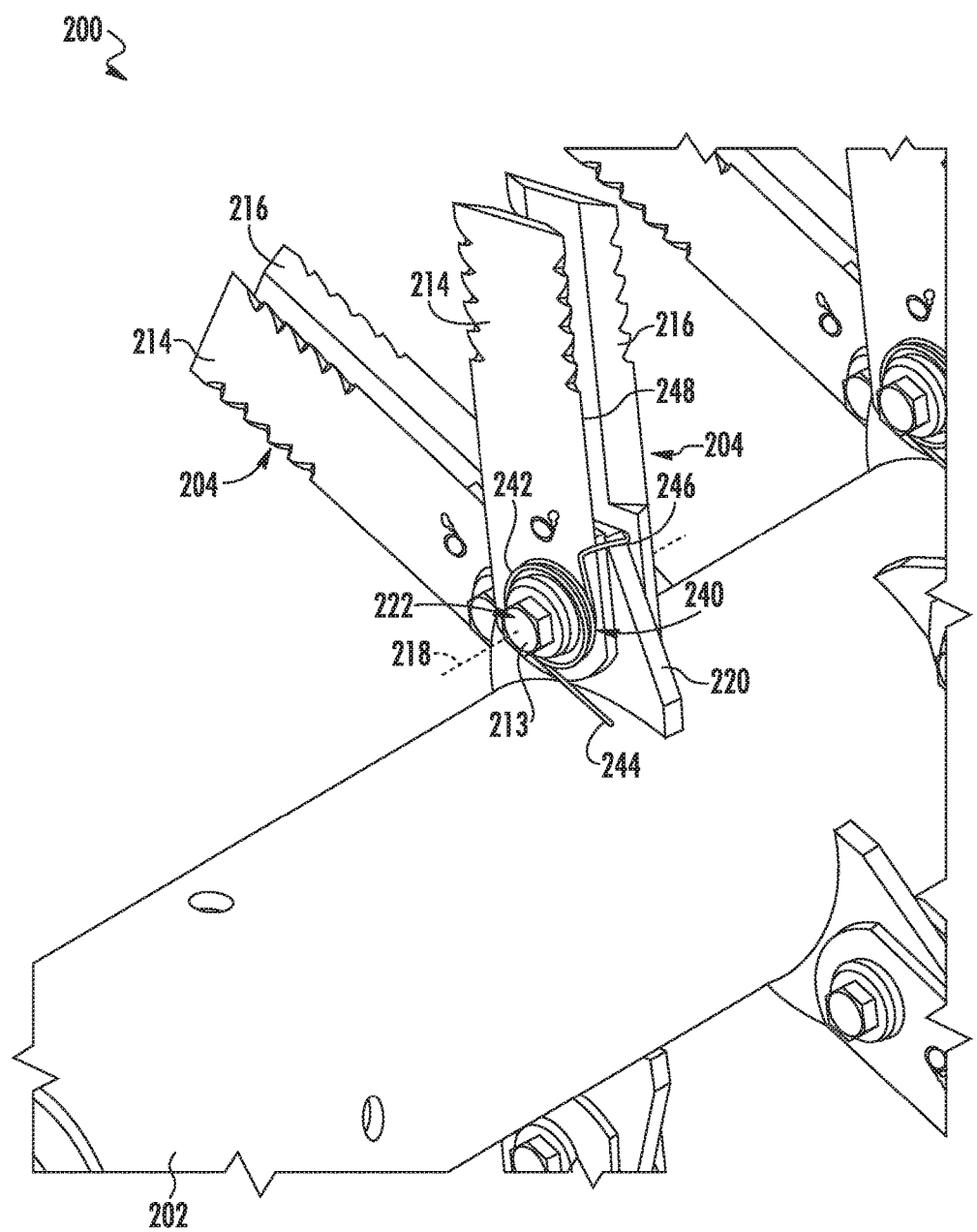
FIG. 7 illustrates a close-up, perspective view of a portion of the chopper assembly shown in FIG. 6.

Referring now to FIGS. 6 and 7, another embodiment of a chopper assembly 200 suitable for use within a crop residue distribution system of an agricultural combine is illustrated in accordance with aspects of the present subject matter. Specifically, FIG. 6 illustrates a perspective view of the chopper assembly 200. Additionally, FIG. 7 illustrates a close-up, perspective view of a portion of the chopper assembly 200 shown in FIG. 7.

In general, the chopper assembly 200 may be configured similarly to the chopper assembly 100 described above with reference to FIGS. 2-5. For instance, the chopper assembly 200 may include a rotor shaft 202 extending lengthwise or axially along a rotational axis 206 between a first end 208 and a second end 210, with the rotor shaft 202 being configured to rotate about the rotational axis 206 in a given rotational direction (e.g., indicated by arrow 212 in FIGS. 6 and 7). In addition, the chopper assembly 200 may include a plurality of flail blades 204, with each flail blade 204 include one or more blade members (e.g., a first blade member 214 and a second blade member 216) pivotally coupled to the rotor shaft 202 (e.g., via a mounting flange 220 and a pivot bolt 222). As indicated above, the flail blades 204 may be spaced apart axially from one another along the length of the rotor shaft 202 and/or spaced circumferentially from one another around the circumference of the rotor shaft 202.

Additionally, in several embodiments, the chopper assembly 200 may include a biasing means for biasing at least one of the flail blades 204 in the forward direction towards its radially oriented position (e.g., in the rotational direction 212 of the rotor shaft 202). Specifically, as shown in the illustrated embodiment, the chopper assembly 200 may include one or more torsional springs 240 provided in operative association with a corresponding number of flail blades 204, with each torsional spring 240 being configured to apply a biasing force against an adjacent flail blade 204 that biases the flail blade 204 towards its radially oriented position. As such, the torsional spring(s) 240 may assist in maintaining the associated flail blade(s) 204 at their radially oriented positions during low speed operation while still allowing the flail blade(s) 204 to pivot backward against the biasing force applied by the spring 240 when a foreign object is transferred through the chopper assembly 200.

As particularly shown in FIG. 6, a plurality of individual torsional springs 240 may be installed on the chopper assembly 200. For instance, in one embodiment, each flail blade 204 of the chopper assembly 200 may include a torsional spring 240 provided in operative association therewith so as to apply a biasing force against the flail blade 204. Alternatively, the torsional springs 240 may only be installed relative to only a select number of the flail blades 204.

In general, each torsional spring 240 may be configured to be installed relative to its corresponding flail blade 204 such that the spring 240 applies the desired biasing force against the flail blade 204. For instance, as shown in FIG. 7, in one embodiment, each torsional spring 240 may include a coiled portion 242 and first and second engagement tangs or spring arms 244, 246 extending outwardly from the coiled portion 242. In such an embodiment, the spring arms 244, 246 may be positioned relative to the rotor shaft 202 and/or the flail blade 204 such that the arms 244, 246 provide a moment force on the coiled portion 242 when the flail blade 204 pivots relative to the rotor shaft 202. The coiled portion 242 may then provide a moment reaction that serves as the reactive or biasing force on the flail blade 204 to bias the blade 204 in the rotational direction 212 of the rotor shaft 202 towards its radially oriented position. For instance, as shown in FIG. 7, in one embodiment, the first spring arm 244 may be configured to be engaged against the outer surface of the rotor shaft 202 while the second spring arm 246 may be configured to be engaged against a rear surface 248 of the adjacent blade member of the flail blade 204 (e.g., the first blade member 214). In such an embodiment, when the blade members 214, 216 pivot backwards (e.g., in the direction opposite the rotational direction 211 of the rotor shaft 202) from the neutral or radially oriented position due to an external force being applied to the flail blade 204, the engagement between the first blade member 214 and the second spring arm 246 results in the coiled portion 242 of the spring 240 storing mechanical energy as the blade member 214 pushes the spring arm 246 backwards. When the external force is removed (or when the stored energy exceeds the external force), the stored energy in the coiled portion 242 may serve to force the flail blade 204 back towards its radially oriented position.

As shown in FIG. 7, in one embodiment, the coiled portion 242 of the torsional spring 240 may be configured to be positioned relative to the adjacent flail blade 204 such that the pivot axis 218 of the flail blade 204 extends through the interior or cylindrically shaped open volume defined by the coiled portion 242. Specifically, as shown in the illustrated embodiment, the spring 240 may be installed onto the flail blade 204 such that the coiled portion 242 wraps or extends around the pivot bolt 222. As such, the pivot axis 218 defined by the pivot bolt 222 may extend directly though the coiled portion 242 of the spring 240.

In the illustrated embodiment, the second spring arm 246 is only shown as engaging the first blade member 214 of the adjacent flail blade 204. However, in other embodiments, the second spring arm 246 may be configured to engage both the first blade member 214 and the second blade member 216. For instance, the second spring arm 246 may be lengthened such that it extends axially across a portion of both the first blade member 214 and the second blade member 216.

Figure 8:
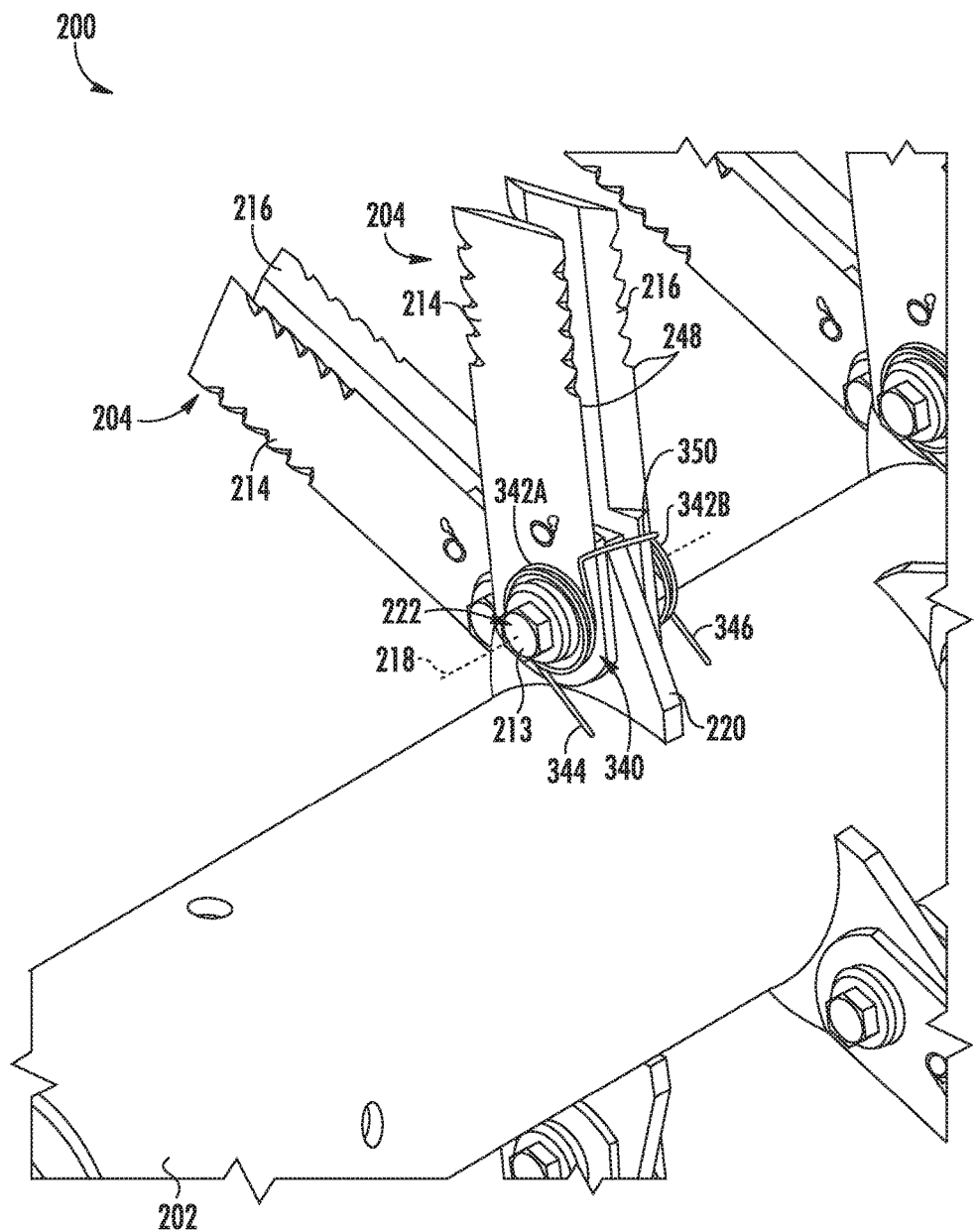
FIG. 8 illustrates another close-up, perspective view of a portion of the chopper assembly shown in FIG. 6, particularly illustrating another embodiment of a torsional spring that may be utilized with the chopper assembly.

Referring now to FIG. 8, an alternative embodiment of a torsional spring 340 that may be utilized with the disclosed chopper assembly 200 is illustrated in accordance with aspects of the present subject matter. As shown, the torsional spring 340 includes first and second coiled portions 342A, 342B configured to be installed on opposed sides of the flail blade 204. Specifically, the first coiled portion 342A may be configured to be positioned adjacent to the first blade member 214 such that the first coiled portion 342A is wrapped or extends around a first end 213 of the pivot bolt 222 extending outwardly from the first blade member 214. Additionally, the second coiled portion 342B may be configured to be positioned adjacent to the second blade member 216 such that the second coiled portion is wrapped or extends around a second end (not shown) of the pivot bolt 222 extending outwardly from the second blade member 216. In such an embodiment, the pivot axis 218 of the flail blade 204 may be configured to extend through both the first coiled portion 342A and the second coiled portion 342B of the torsional spring 340.

Moreover, as shown in FIG. 8, the torsional spring 340 may include a first tang or spring arm 344 and a second tang or spring arm 346, with the first spring arm 344 extending outwardly from the first coiled portion 342A so as to be engaged against the outer surface of the rotor shaft 202 at a first axial location and the second spring arm 346 extending outwardly form the second coiled portion 342B so as to be engaged against the outer surface of the rotor shaft 202 at a different axial location. In addition, the torsional spring 340 may include a connector spring arm 350 extending between the first and second coiled portions 342A, 342B. As shown in FIG. 8, the connector spring arm 350 may be configured to engage the back or rear surfaces 248 of the first and second blade members 214, 216 as it extends between the coiled portions 342A, 342B of the spring 340.

It should be appreciated that, although the fixed blades 124 and torsional springs 240, 340 were generally describe above as separate embodiments, such components may be utilized in combination with each another. For example, FIG. 9 illustrates a perspective view of the chopper assembly 100 shown in FIG. 2 with the torsional springs 240 shown in FIGS. 6 and 7 installed onto several of the flail blades 104. In such an embodiment, the torsional springs 240 may be installed onto any number of the flail blades 104, including the flail blades 104 having a fixed blade 124 associated therewith and/or the flail blades 104 that do not include a trailing fixed blade 124 axially aligned therewith.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A chopper assembly for a crop residue distribution system of an agricultural combine, the chopper assembly comprising:
   a rotor shaft extending lengthwise along a rotational axis between a first end and a second end;
   a plurality of flail blades pivotally coupled to the rotor shaft, each flail blade configured to pivot relative to the rotor shaft about a pivot axis, the plurality of flail blades being spaced apart axially from one another between the first and second ends of the rotor shaft; and
   a plurality of fixed blades non-pivotally coupled to the rotor shaft, the plurality of fixed blades being spaced apart axially from one another between the first and second ends of the rotor shaft,
   wherein each fixed blade is axially aligned with a respective flail blade of the plurality of flail blades, and
   wherein each fixed blade is non-pivotally coupled to the rotor shaft at a location that is circumferentially offset from the respective flail blade.

2. The chopper assembly of claim 1, wherein each fixed blade is circumferentially offset from the respective flail blade by an offset angle ranging from 60 degrees to 120 degrees.

3. The chopper assembly of claim 2, wherein the rotor shaft is configured to be rotated in a rotational direction about the rotational axis, each fixed blade being circumferentially offset from the respective flail blade by the offset angle in a direction opposite the rotational direction of the rotor shaft.

4. The chopper assembly of claim 1, wherein each of the plurality of flail blades is configured to pivot relative to the rotor shaft from a radially oriented position to a maximum pivot position, wherein each fixed blade is circumferentially offset from the respective flail blade such that the respective flail blade does not contact the corresponding fixed blade when the respective flail blade pivots towards the fixed blade to the maximum pivot position.

5. The chopper assembly of claim 1, wherein each flail blade comprises a first blade member and a second blade member pivotally coupled to the rotor shaft about a common pivot axis.

6. The chopper assembly of claim 1, further comprising a biasing member coupled to at least one flail blade of the plurality of flail blades, the biasing member being configured to apply a biasing force against the at least one flail blade that urges the at least one flail blade to pivot relative to the rotor shaft in a rotational direction of the rotor shaft.

7. The chopper assembly of claim 6, wherein the biasing member comprises a torsional spring.

8. A chopper assembly for a crop residue distribution system of an agricultural combine, the chopper assembly comprising:
   a rotor shaft extending lengthwise along a rotational axis, the rotor shaft being configured rotate about the rotational axis in a rotational direction;
   a plurality of flail blades coupled to the rotor shaft, each flail blade including at least one blade member pivotally coupled to the rotor shaft at a pivot axis such that the at least one blade member is configured to pivot relative to the rotor shaft about the pivot axis; and
   a torsional spring coupled to the at least one blade member, the torsional spring being configured to apply a biasing force against the at least one blade member that urges the at least one blade member to pivot relative to the rotor shaft in the rotational direction of the rotor shaft.

9. The chopper assembly of claim 8, wherein the torsional spring includes a coiled portion positioned relative to the at least one blade member such that the pivot axis for the at least one blade member extends through the coiled portion.

10. The chopper assembly of claim 9, wherein the pivot axis is defined by a pivot bolt extending through the at least one blade member, the coiled portion extending around at least a portion of the pivot bolt.

11. The chopper assembly of claim 8, wherein the torsional spring includes a coiled portion and first and second spring arms extending from the coiled portion, the first spring arm configured to be engaged against the rotor shaft and the second spring arm configured to be engaged against the at least one blade member.

12. The chopper assembly of claim 8, wherein the at least one blade member comprises a first blade member and a second blade member, the torsional spring including first and second coiled portions, a first spring arm extending from the first coiled portion, a second spring arm extending from the second coiled portion, and a connector spring arm extending between the first and second coiled portions.

13. The chopper assembly of claim 12, wherein the first and second blade members are pivotally coupled to the rotor shaft via a pivot bolt extending axially along the pivot axis, the first coiled portion being positioned adjacent to the first blade member at one end of the pivot bolt and the second coiled portion being positioned adjacent to the second blade member at an opposed end of the pivot bolt.

14. The chopper assembly of claim 13, wherein the pivot axis extends through both the first coiled portion and the second coiled portion.

15. The chopper assembly of claim 12, wherein the first and second spring arms are configured to engage the rotor shaft and the connector arm is configured to engage the first and second blade members.

16. An agricultural combine, comprising:
   a threshing system configured to separate crop residue from another crop material received by the threshing system; and
   a crop residue distribution system configured to receive the crop residue discharged from the threshing system, the crop residue distribution system including a chopper assembly, the chopper assembly comprising:

a rotor shaft extending lengthwise along a rotational axis between a first end and a second end, the rotor shaft being configured rotate about the rotational axis in a rotational direction;

a plurality of flail blades pivotally coupled to the rotor shaft, each flail blade including at least one blade member configured to pivot relative to the rotor shaft about a pivot axis, the plurality of flail blades being spaced apart axially from one another between the first and second ends of the rotor shaft;

a fixed blade non-pivotally coupled to the rotor shaft, the fixed blade being axially aligned with a corresponding flail blade of the plurality of flail blades; and a torsional spring coupled to the at least one blade member of a given flail blade of the plurality of flail blades, the torsional spring being configured to apply a biasing force against the at least one blade member that urges the at least one blade member to pivot relative to the rotor shaft in the rotational direction of the rotor shaft.

17. The agricultural combine of claim 16, wherein the fixed blade is non-pivotally coupled to the rotor shaft at a location that is circumferentially offset from the corresponding flail blade.

18. The agricultural combine of claim 16, wherein the torsional spring includes a coiled portion and first and second spring arms extending from the coiled portion, the first spring arm configured to be engaged against the rotor shaft and the second spring arm configured to be engaged against the at least one blade member.

19. The agricultural combine of claim 18, wherein the coiled portion is positioned relative to the at least one blade member such that the pivot axis for the at least one blade member extends through the coiled portion.

20. A chopper assembly for a crop residue distribution system of an agricultural combine, the chopper assembly comprising:

a rotor shaft extending lengthwise along a rotational axis between a first end and a second end;

a plurality of flail blades pivotally coupled to the rotor shaft, each flail blade configured to pivot relative to the rotor shaft about a pivot axis, the plurality of flail blades being spaced apart axially from one another between the first and second ends of the rotor shaft, a biasing member coupled to at least one flail blade of the plurality of flail blades, the biasing member being configured to apply a biasing force against the at least one flail blade that urges the at least one flail blade to pivot relative to the rotor shaft in a rotational direction of the rotor shaft; and a plurality of fixed blades non-pivotally coupled to the rotor shaft, the plurality of fixed blades being spaced apart axially from one another between the first and second ends of the rotor shaft, wherein each fixed blade is axially aligned with a respective flail blade of the plurality of flail blades.

\* \* \* \* \*